US012048022B2

(12) United States Patent
Lee et al.

(10) Patent No.: US 12,048,022 B2
(45) Date of Patent: Jul. 23, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 17/578,186

(22) Filed: Jan. 18, 2022

(65) Prior Publication Data

US 2022/0232635 A1 Jul. 21, 2022

(30) Foreign Application Priority Data

Jan. 18, 2021 (KR) ........................ 10-2021-0006623

(51) Int. Cl.
*H04W 74/0833* (2024.01)
*H04W 74/00* (2009.01)

(52) U.S. Cl.
CPC ..... *H04W 74/0833* (2013.01); *H04W 74/008* (2013.01)

(58) Field of Classification Search
None
See application file for complete search history.

(56) References Cited

U.S. PATENT DOCUMENTS 11,452,145 B2 * 9/2022 Sun .................. H04W 72/0446
2019/0394799 A1 * 12/2019 Islam ................. H04W 56/001
2021/0029738 A1 * 1/2021 Zhou .................... H04L 5/0053

* cited by examiner

*Primary Examiner* — Angela Nguyen
(74) *Attorney, Agent, or Firm* — BRYAN CAVE LEIGHTON PAISNER LLP

(57) ABSTRACT

Various embodiments of the present disclosure relate to a next-generation wireless communication system for supporting high data transfer rates beyond the 4th generation (4G) wireless communication system. According to the various embodiments, a method of transmitting and receiving signals in a wireless communication system and apparatus for supporting the same may be provided.

15 Claims, 18 Drawing Sheets

| R | Timing Advance Command | | Oct 1 |
|---|---|---|---|
| Timing Advance Command | | UL Grant | Oct 2 |
| UL Grant | | | Oct 3 |
| UL Grant | | | Oct 4 |
| Temporaty C-RNTI | | | Oct 5 |
| Temporaty C-RNTI | | | Oct 6 |
| Repetition number | Repetition interval | Capa | Oct 7 |

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of KR Application No. 10-2021-0006623 filed on Jan. 18, 2021 which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

In an aspect of the present disclosure, a method for receiving a signal in a random access procedure by a user equipment (UE) in a wireless communication system is provided.

The method may include receiving random access configuration information; transmitting a random access preamble through a physical random access channel (PRACH) based on the random access configuration information; and receiving a random access response to the PRACH.

The random access configuration information includes information about a first RACH resource configuration for a specific-type UE and information about a legacy UE.

Among RACH resources according to the first RACH resource configuration, a resource overlapping RACH resources caused by the second RACH resource configuration is invalid.

If the UE corresponds to the specific-type UE, the random access preamble is transmitted through a valid RACH resource from among the RACH resources caused by the first RACH resource configuration.

The first RACH resource configuration and the second RACH resource configuration have different system frame number (SFN) values, are allocated to different RACH slots, or are configured to have different starting symbols within the same RACH slot.

The method may further include, when the first RACH resource configuration and the second RACH resource configuration indicate different PRACH preambles of different RACH occasions (ROs) in the same RACH slot, determining the resource for the first RACH resource configuration to be valid.

The method may further include, when the first RACH resource configuration and the second RACH resource configuration are set to the same PRACH resources in the same RACH slot, determining the RACH resource for the second RACH resource configuration to be valid; and determining the RACH resource for the first RACH resource configuration to be invalid.

The method may further include, when overlapping with the RACH resources caused by the second RACH resource configuration from among the RACH resources caused by the first RACH resource configuration is performed, determining the RACH resources caused by the second RACH resource configuration to be valid.

The specific UE is a UE for supporting a reduced capability as compared to the legacy UE or is a UE for supporting an enhanced coverage as compared to the legacy UE, and the reduced capability refers to a limited transmission/reception bandwidth or a limited number of transmission/reception antennas.

A non-transitory computer readable medium having program code required for performing the above-described method is disclosed.

According to one example of the present disclosure, a user equipment (UE) for receiving a signal in a random access procedure of a wireless communication system is disclosed.

The UE may include a transceiver; and at least one processor connected to the transceiver.

The at least one processor includes: receiving random access configuration information; transmitting a random access preamble through a physical random access channel (PRACH) based on the random access configuration information; and receiving a random access response to the PRACH.

The random access configuration information includes information about a first RACH resource configuration for a specific-type UE and information about a legacy UE; from among RACH resources according to the first RACH resource configuration, a resource overlapping RACH resources caused by the second RACH resource configuration is invalid; and if the UE corresponds to the specific-type UE, the random access preamble is transmitted through a valid RACH resource from among the RACH resources caused by the first RACH resource configuration.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

DETAILED DESCRIPTION

Figure 1:
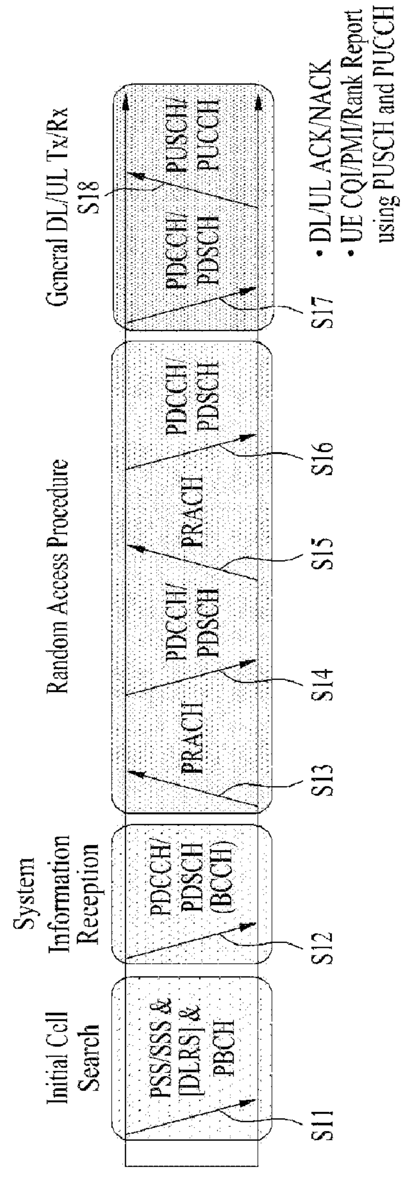
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.

Serving Cell: A PCell, a PSCell, or an SCell

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
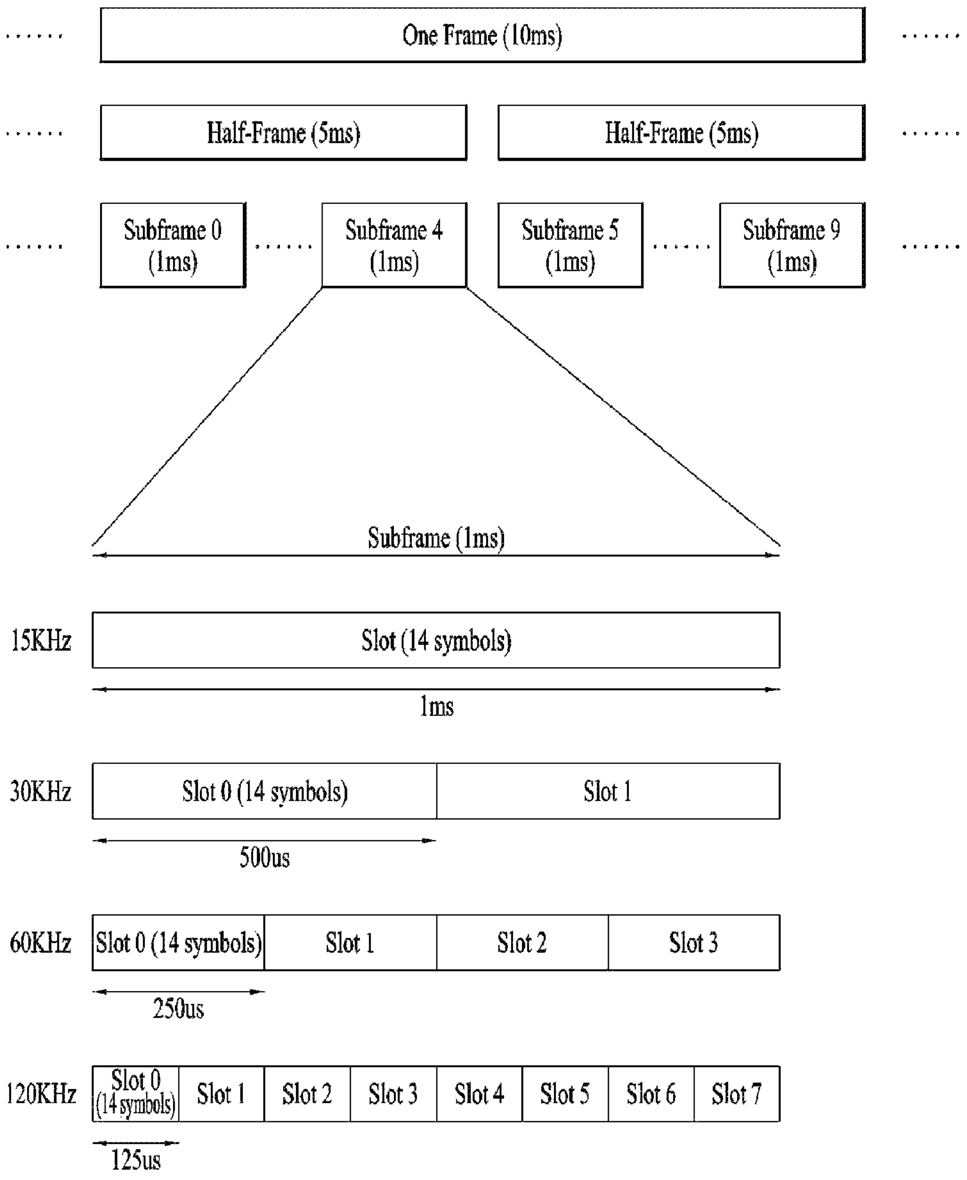
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*$2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*$2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
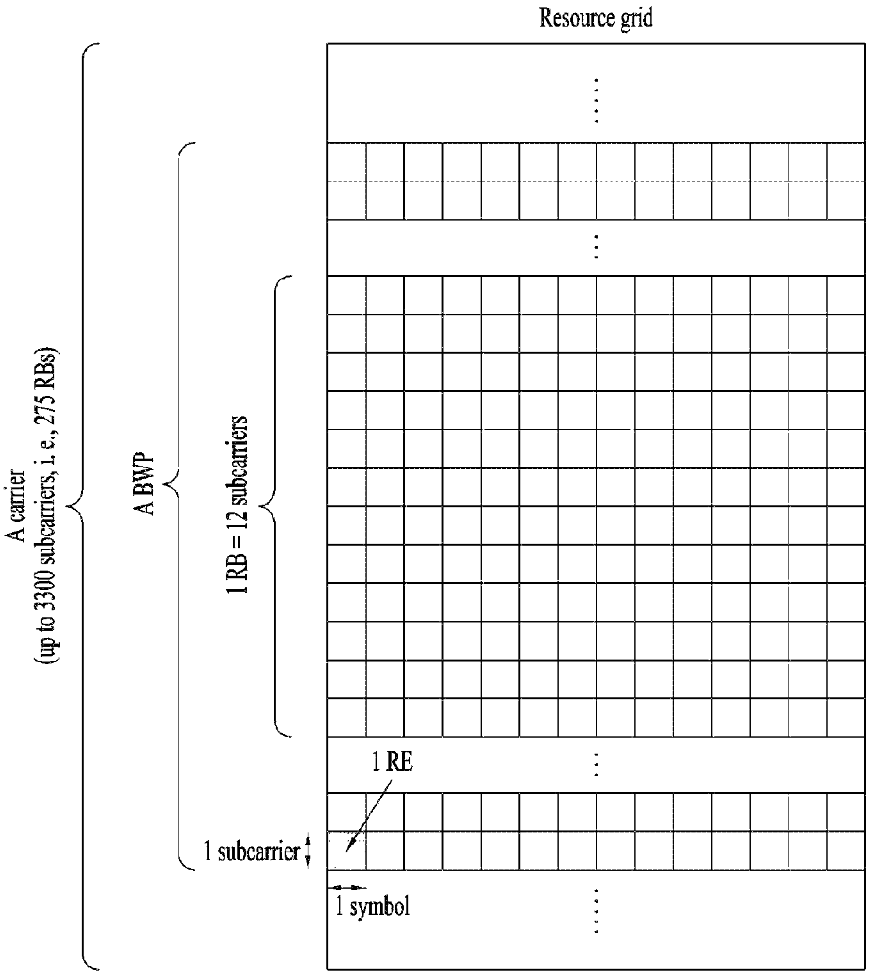
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
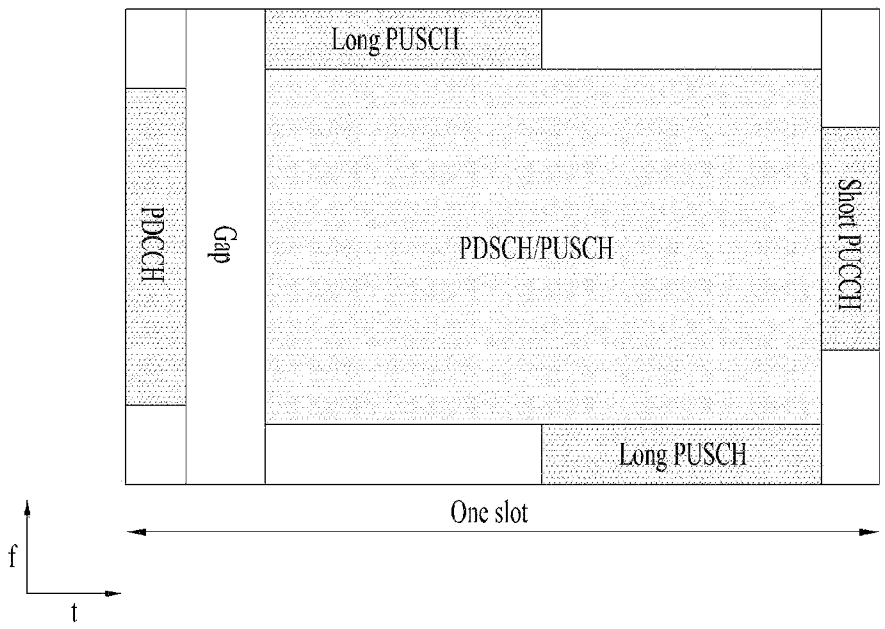
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
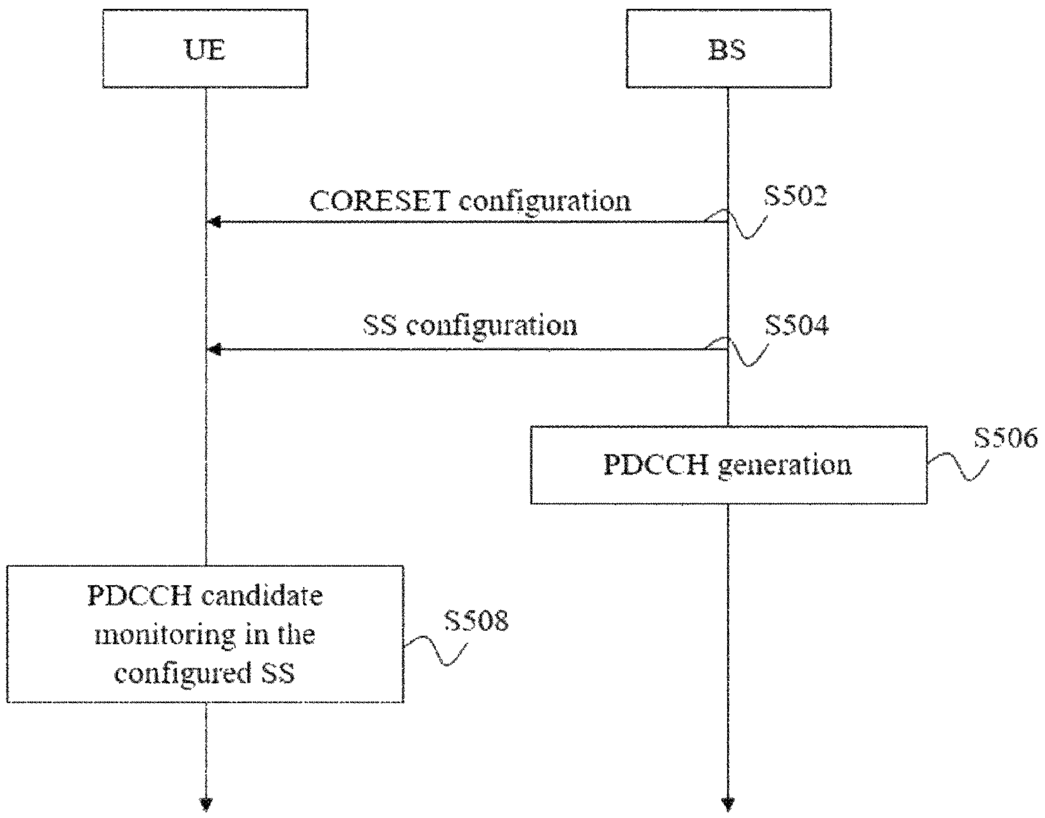
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling oR-UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) oR-UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHz). The UE determines that a control resource set for Type0-PDCCH common search space is not present if $k_{SSB} > 23$ for FR1 and if $k_{SSB} > 11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.—SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
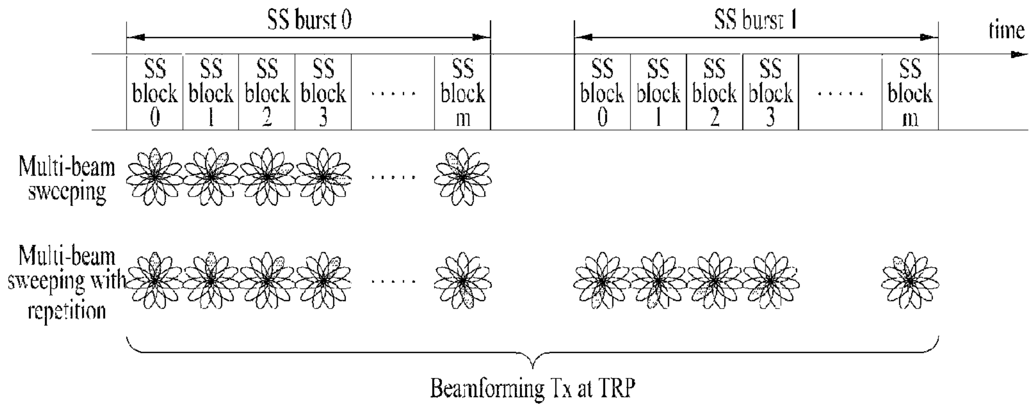
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

* Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
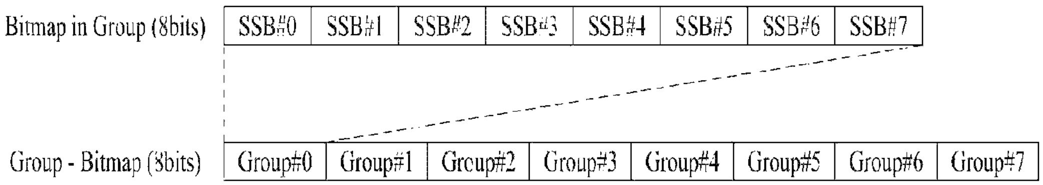
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 In NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
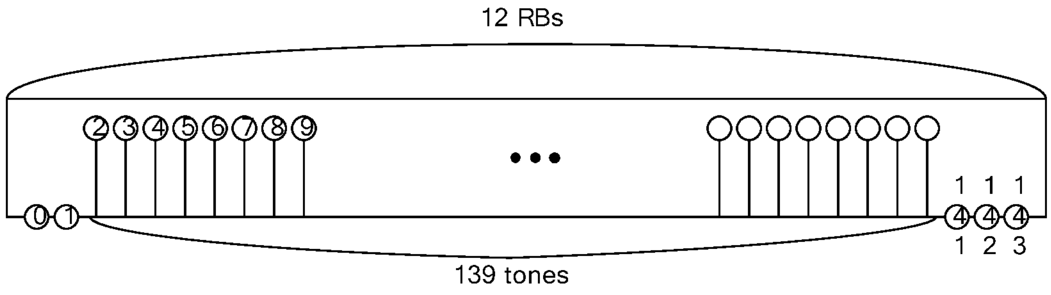
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, μ is defined as one of {0, 1, 2, 3} according to the value of subcarrier spacing. For example, in the case of 15 kHz subcarrier spacing, μ is 0. In the case of 30 kHz subcarrier spacing, μ is 1. Table 5 shows Preamble formats for $L_{RA}$=139 and $\Delta f^{RA}=15\times2^{\mu}$ kHz, where $\mu\in\{0,1,2,3\}$, $\kappa=T_S/T_C=64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^{\mu}$ kHz | $2 \times 2048\kappa \times 2^{-\mu}$ | $288\kappa \times 2^{-\mu}$ |
| A2 | 139 | $15 \times 2^{\mu}$ kHz | $4 \times 2048\kappa \times 2^{-\mu}$ | $576\kappa \times 2^{-\mu}$ |
| A3 | 139 | $15 \times 2^{\mu}$ kHz | $6 \times 2048\kappa \times 2^{-\mu}$ | $864\kappa \times 2^{-\mu}$ |
| B1 | 139 | $15 \times 2^{\mu}$ kHz | $2 \times 2048\kappa \times 2^{-\mu}$ | $216\kappa \times 2^{-\mu}$ |
| B2 | 139 | $15 \times 2^{\mu}$ kHz | $4 \times 2048\kappa \times 2^{-\mu}$ | $360\kappa \times 2^{-\mu}$ |
| B3 | 139 | $15 \times 2^{\mu}$ kHz | $6 \times 2048\kappa \times 2^{-\mu}$ | $504\kappa \times 2^{-\mu}$ |
| B4 | 139 | $15 \times 2^{\mu}$ kHz | $12 \times 2048\kappa \times 2^{-\mu}$ | $936\kappa \times 2^{-\mu}$ |
| C0 | 139 | $15 \times 2^{\mu}$ kHz | $2048\kappa \times 2^{-\mu}$ | $1240\kappa \times 2^{-\mu}$ |
| C2 | 139 | $15 \times 2^{\mu}$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

| PRACH Configuration Index | Preamble format | $n_{SFN}$ mod x = y: x | y | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| 81 | A1 | 1 | 0 | 4.9 | 0 | 1 | 6 | 2 |
| 82 | A1 | 1 | 0 | 7.9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4.9 | 0 | 1 | 2 | 6 |
| 128 | A3 | 1 | 0 | 7.9 | 7 | 1 | 1 | 6 |
| 142 | B1 | 1 | 0 | 4.9 | 2 | 1 | 6 | 2 |
| 143 | B1 | 1 | 0 | 7.9 | 8 | 1 | 3 | 2 |
| 221 | A1/B1 | 1 | 0 | 4.9 | 2 | 1 | 6 | 2 |
| 222 | A1/B1 | 1 | 0 | 7.9 | 8 | 1 | 3 | 2 |
| 235 | A2/B2 | 1 | 0 | 4.9 | 0 | 1 | 3 | 4 |
| 236 | A2/B2 | 1 | 0 | 7.9 | 6 | 1 | 2 | 4 |
| 251 | A3/B3 | 1 | 0 | 4.9 | 0 | 1 | 2 | 6 |
| 252 | A3/B3 | 1 | 0 | 7.9 | 2 | 1 | 2 | 6 |

Figure 9:
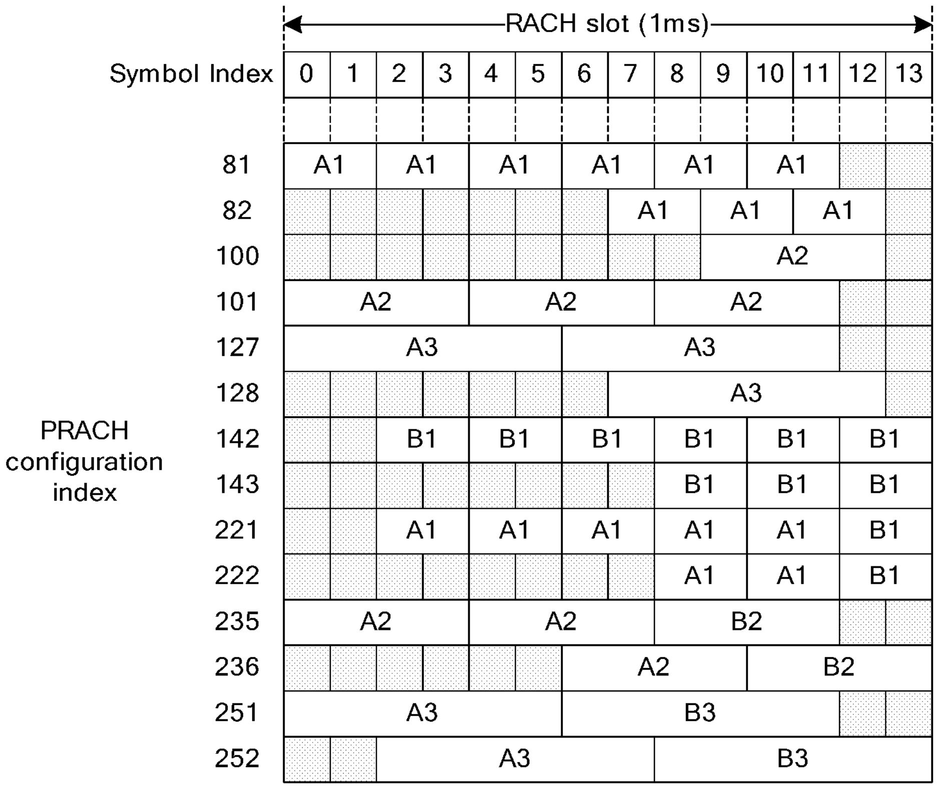
FIG. 9 illustrates an example of a RACH occasion defined in one RACH slot in the NR system.

Referring to Table 6, information about the number of ROs defined in a RACH slot for each preamble format (i.e., $N_t^{RA, slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

FIG. 10 illustrates an example of a RACH procedure.

In summary, a random access procedure of the user equipment (UE) can be summarized as in Table 7 and FIG. 10.

TABLE 7

| | Type of Signals | Operations/Information obtained |
|---|---|---|
| $1^{st}$ step | PRACH preamble in UL | Initial beam obtainment<br>Random selection of RA-preamble ID |
| $2^{nd}$ step | Random Access Response on DL-SCH | Timing Advanced information<br>RA-preamble ID<br>Initial UL grant, Temporary C-RNTI |
| $3^{rd}$ step | UL transmission on UL-SCH | RRC connection request<br>UE identifier |
| $4^{th}$ step | Contention Resolution on DL | Temporary C-RNTI on PDCCH for initial access<br>C-RNTI on PDCCH for UE in RRC_CONNECTED |

A random access procedure may be used for various purposes. For example, the random access procedure may be used for network initial access, handover, and UE-triggered UL data transmission. The UE may acquire UL DL synchronization and UL DL transmission resources through the random access procedure. The random access procedure may be classified into a contention-based random access process and a contention-free random access procedure.

Figure 10A:
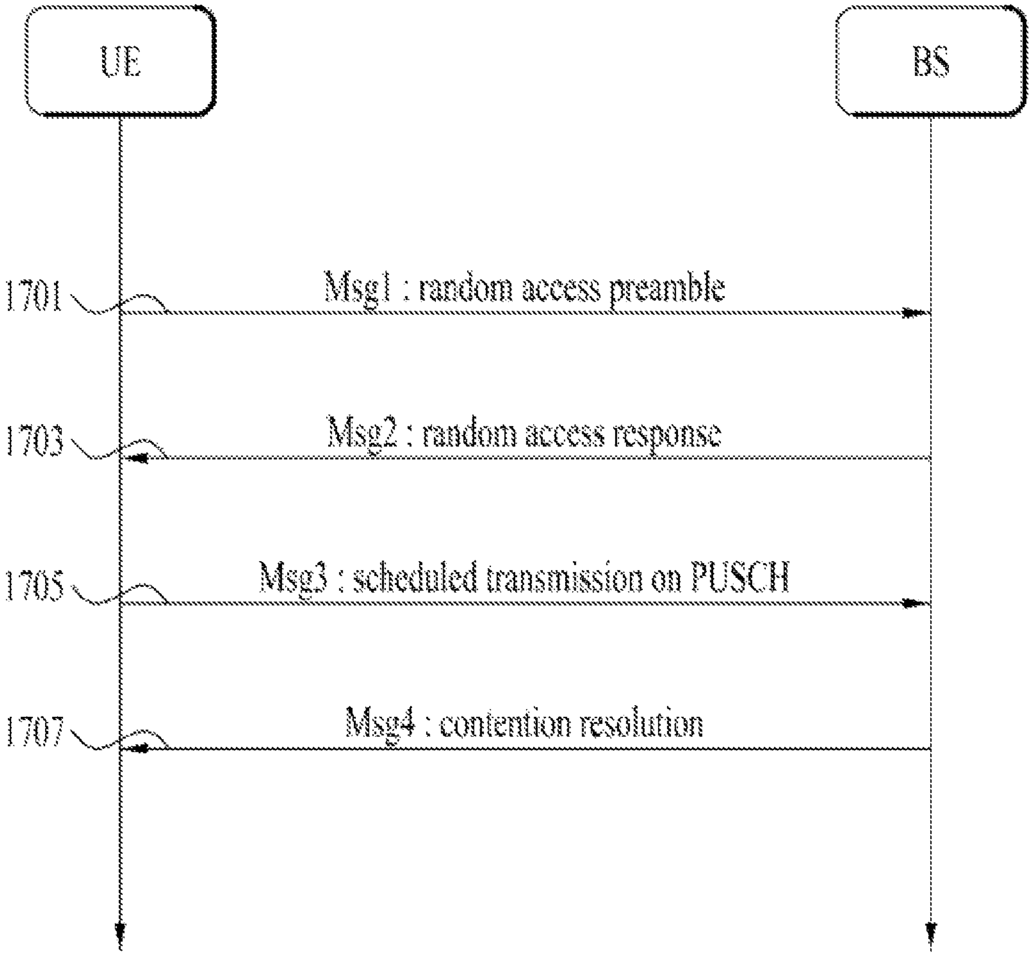
FIG. 10A and FIG. 10B illustrate an example of a RACH procedure.
Figure 10B:
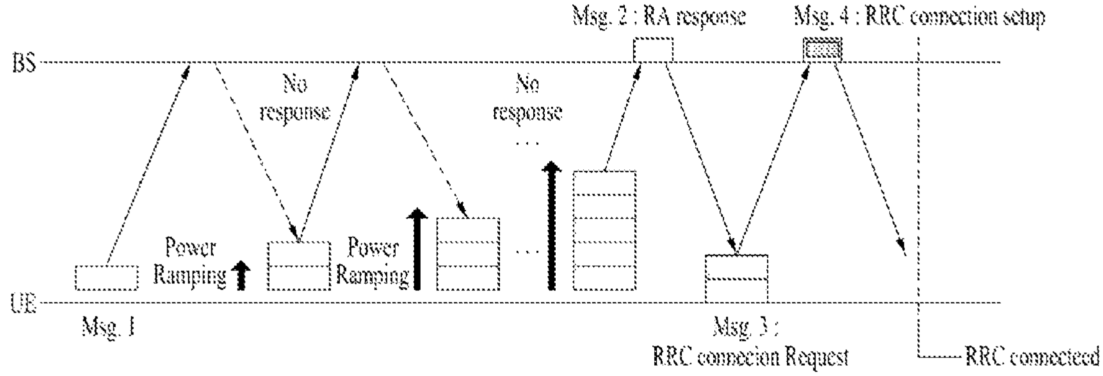

FIGS. 10A and 10B illustrate examples of the random access procedure. In particular, FIGS. 10A and 10B illustrate examples of a contention-based random access procedure.

First, the UE may transmit a random access preamble through the PRACH as the Msg1 of the random access procedure in the UL (e.g., see 1701 of FIG. 10A).

Random access preamble sequences having two different lengths may be supported. The long sequence length 839 may be applied to the subcarrier spacing of 1.25 or 5 kHz, and the short sequence length 139 may be applied to the subcarrier spacing of 15, 30, 60 or 120 kHz.

A plurality of preamble formats may be defined by one or more RACH OFDM symbols and different cyclic prefixes (and/or different guard times). A RACH configuration for a cell may be included in system information of the cell and provided to the UE. The RACH configuration may include information about a subcarrier spacing of the PRACH, available preambles, a preamble format, and the like. The RACH configuration may include association information between SSBs and RACH (time-frequency) resources. The UE may transmit a random access preamble in RACH time-frequency resources associated with the detected or selected SSB.

A threshold of an SSB for RACH resource association may be configured by the network, and transmission or retransmission of the RACH preamble may be performed based on an SSB obtained when a reference signal reception power (RSRP) measured based on the SSB satisfies the threshold. For example, the UE may select one of the SSB(s) satisfying the threshold, and may transmit or retransmit the RACH preamble based on the RACH resource associated with the selected SSB.

When the BS receives the random access preamble from the UE, the BS may transmit a random access response (RAR) message (Msg2) to the UE (e.g., see 1703 of FIG. F3(*a*)). The PDCCH that schedules the PDSCH carrying the RAR may be CRC masked with a random access radio network temporary identifier (RA-RNTI), and may then be transmitted. The UE having detected the PDCCH masked with RA-RNTI may receive the RAR from the PDSCH scheduled by the DCI carried by the PDCCH. The UE may determine whether random access response information for the preamble (i.e., Msg1) transmitted by the UE is within the RAR. Information about the presence or absence of the random access information for the Msg1 transmitted by the UE may be determined by information about the presence or absence of a random access preamble ID for the preamble transmitted by the UE. If there is no response to the Msg1, the UE may retransmit the RACH preamble within a predetermined number of times while performing power ramping. The UE may calculate PRACH transmission power for preamble retransmission based on the most recent pathloss and the power ramping counter.

When the UE (a temporary UE) receives its own random access response information on a PDSCH as well as timing advance information for UL synchronization and a UL grant, the UE can recognize timing advance information for UL synchronization, an initial UL grant, and a UE temporary C-RNTI (cell RNTI). The above-described timing advanced information may be used to control a UL signal transmission timing point. In order to allow PUSCH/PUCCH transmission by the UE to be easily aligned with subframe timing at the network end, the network (e.g., BS) may measure a time difference between a subframe and PUSCH/PUCCH/SRS reception, and may transmit timing advance information based on the time difference. The UE may transmit data for UL transmission as Msg3 of the random access procedure over an uplink shared channel on the basis of the random access response information (e.g., see 1705 of FIG. 10A). Msg3 may include an RRC connection request and a UE identifier (ID). As a response to Msg3, the network may transmit an Msg4, and Msg4 transmission may be handled as a contention resolution message on a downlink (DL) (e.g., see 1706 of FIG. 10A). By receiving the Msg4, the UE may enter an RRC connected state.

On the other hand, the contention-free random access procedure may be used in a handover procedure in which the UE is handed over to another cell or another BS, or may be performed in an example case requested by a command of the base station (BS). A basic procedure of the contention-free random access procedure may be similar to the contention-based random access procedure. However, unlike the contention-based random access process in which the UE randomly selects a preamble to be used among a plurality of random access preambles, a preamble (hereinafter, a dedicated random access preamble) to be used by the UE may be allocated to the UE by the BS in the contention-free random access procedure. Information about the dedicated random access preamble may be included in an RRC message (e.g., a handover command), or may be provided to the UE through a PDCCH order. When the random access procedure is initiated, the UE may transmit a dedicated random access preamble to the BS. If the UE receives the random access procedure from the BS, the random access procedure is completed.

As previously described above, the UL grant within the RAR may schedule PUSCH transmission for the UE. The PUSCH carrying the initial UL transmission by the UL grant within the RAR may also be referred to as "Msg3 PUSCH". The content of the RAR UL grant starts at the MSB and ends at the LSB, and is represented as shown in Table 8.

TABLE 8

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command may be used to determine transmit (Tx) power of the Msg3 PUSCH. For example, the TPC command may be interpreted as shown in Table 9.

TABLE 9

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access process, a CSI request field in the RAR UL grant may indicate whether the UE will include the aperiodic CSI report in the corresponding PUSCH transmission. The subcarrier spacing for the Msg3 PUSCH transmission may be provided by the RRC parameter. The UE will transmit the PRACH and the Msg3 PUSCH on the same uplink carrier of a cell providing the same service. UL BWP for Msg3 PUSCH transmission may be indicated by SIB1 (SystemInformationBlock1).

Figure 11A:
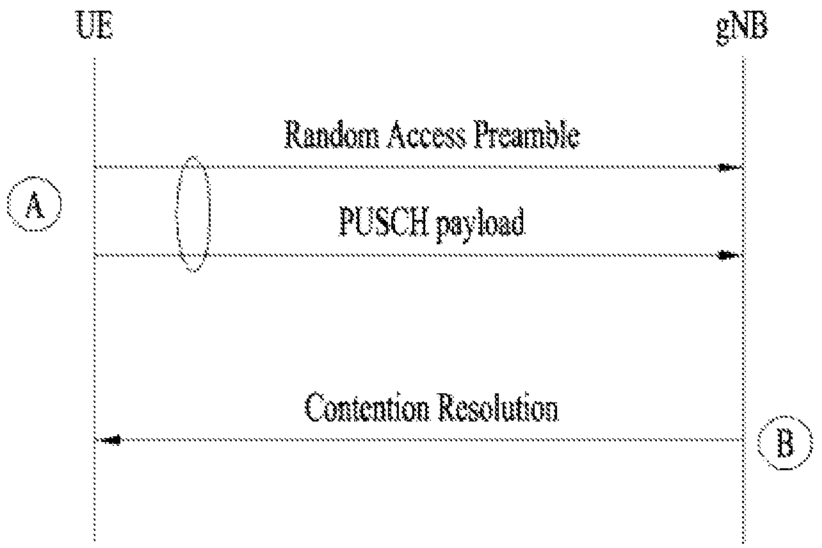
FIG. 11A and FIG. 11B illustrate an example of a 2-step RACH procedure.
Figure 11B:
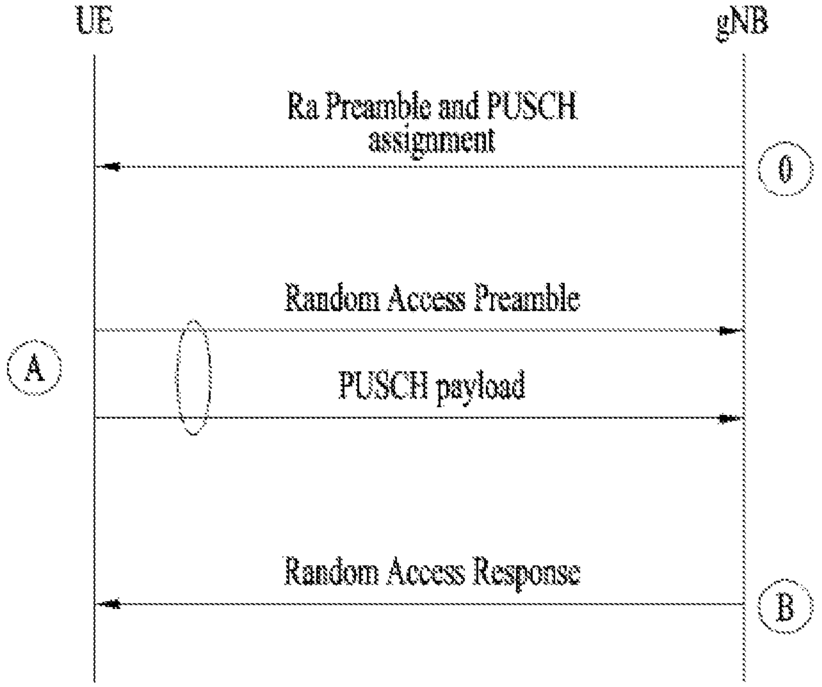

FIG. 11 is a diagram illustrating a 2-step RACH procedure. Specifically, as shown in FIG. 11, FIG. 11A shows a contention-based random access (CBRA), and FIG. 11B shows a contention-free random access (CFRA).

In FIG. 11, Message A (MsgA) may include a preamble and a payload (PUSCH payload). The preamble and payload may be multiplexed in a TDM scheme. Message B (MsgB) may be transmitted for contention resolution, fallback indication (S), and/or backoff indication by responding to Message A (MsgA).

According to the present disclosure, the UE accessing a cell should generally support a constant UE capability. For example, in order to access an LTE cell, the UE should be able to receive an MIB and an SIB that are broadcast by the BS for the corresponding cell. Since there are several types of SIB and the SIB can be transmitted through a plurality of PRBs, the UE accessing the LTE cell should have capability capable of receiving a minimum of 20 MHz bandwidth.

In order to access the NR cell, the UE must receive an MIB through the SSB/PBCH being transmitted to the initial DL BWP. In addition, even in the case where the SSB/PBCH can be received, it should be checked whether the UE can access the corresponding cell according to the cell access information included in the SIB1. To this end, the UE can determine the presence or absence of a control resource set (CORESET) for a Type-0-PDCCH common search space on the basis of the MIB. If the presence of the Type0-PDCCH common search space is determined, the UE may determine CORSET #0 and PDCCH opportunity based on information (e.g., pdcch-ConfigSIB1) included in the MIB, and may receive the SIB1 through the PDSCH indicated by the PDCCH having been received in the PDCCH opportunity.

The UE having received the SIB must check various types of information so as to determine whether to access the corresponding cell. If some information does not satisfy the condition, the UE may set the corresponding cell to a connection-forbidden cell. For example, the maximum UL channel bandwidth supported by the UE should be greater than or equal to the bandwidth of the initial UL BWP, and the maximum DL channel bandwidth supported by the UE should be greater than or equal to the bandwidth of the initial DL BWP. If the above-described requirements are not satisfied, the corresponding cell is configured as a connection-forbidden cell.

On the other hand, Rel-17 NR attempts to support a UE that has a reduced capability, supports an enhanced coverage, or provides other specific functions. In this case, this UE will hereinafter be referred to as an R-terminal or R-UE different from the existing REL-15 UE.

Since the R-UE supports limited UE capability as compared to the existing UE, problems may occur in the cell access process. For example, the R-UE may not receive the MIB via the initial DL BWP of the existing NR cell, and may not receive the PDCCH scheduling CORSET #0 or SIB1 even when MIB can be received. Alternatively, the R-UE may not be greater than or equal to the bandwidth of the initial BWP in which the maximum UL channel bandwidth or the maximum DL channel bandwidth is supported. Alternatively, due to numerology supported by the initial BWP of the existing cell, there may occur unexpected problems that the R-UE does not receive a paging message transmitted by the BS or does not perform UL RACH transmission for initial access.

Therefore, according to the present disclosure, when the R-UE having specific capability is initially connected to the wireless network system through one cell, the RACH process for the initial access is performed, and a method for indicating whether a specific function such as limited capability or repeated transmission/reception of the UE is supported through the RACH is proposed.

The BS provides a special random access configuration to the R-UE through system information in a corresponding cell, and the UE may select one initial uplink BWP or only one of the plurality initial access BWPs according to UE-supported capability or UE-requested system information, may select a special random access configuration for the R-UE, and may transmit Msg1, Msg3, and MsgA. In addition, according to the above-described selection, one initial downlink BWP may be selected from among the plurality of initial downlink BWPs, so that the UE can transmit Msg2 in response to Msg1, transmit Msg4 in response to Msg3, and transmit MsgB in response to MsgA.

The special random access configuration may include an RO (RACH occasion), a random access resource (RAR), a random access preamble identifier (RAPID), an association period index (API), etc. Here, the specific capability may include reduced UE Rx/Tx bandwidth, the number of limited UE RX/TX antennas, or information about whether repeated transmission/reception of RACH transmission is supported, etc. If the BS does not provide the special random access configuration, the R-UE may forbid access to the corresponding cell or perform RACH processing using a general random access configuration. Here, the general random access configuration may refer to a random access configuration used by the general UE instead of the R-UE. Alternatively, even when the general UE is in the enhanced coverage, RACH processing may be performed using the special random access configuration.

Transmitter and Receiver (UE and BS)

From the viewpoint of the BS, one cell must simultaneously operate two types of SIB1, i.e., SIB1 and R-SIB1, one type of MIB may be mapped to the two types of SIB1. Alternatively, MIB may operate by mapping to the existing SIB1, and the existing SiB1 may operate by mapping to R-SIB1. The existing SIB1 and the existing R-SIB1 may include scheduling information (e.g., schedulingInfoList) indicating whether other SIBs are broadcast and information about a transmission period. In addition, one cell may simultaneously operate the existing SiBx(s) and new SIBx (s) as necessary. The new SiBx may include R-UE dedicated information or information not corresponding to the existing UE, and will hereinafter be referred to as R-SIBx.

The BS may provide RACH configuration information that can be used by the R-UE using SIB1 or R-SIB1 being operated through only one cell.

Figure 12:
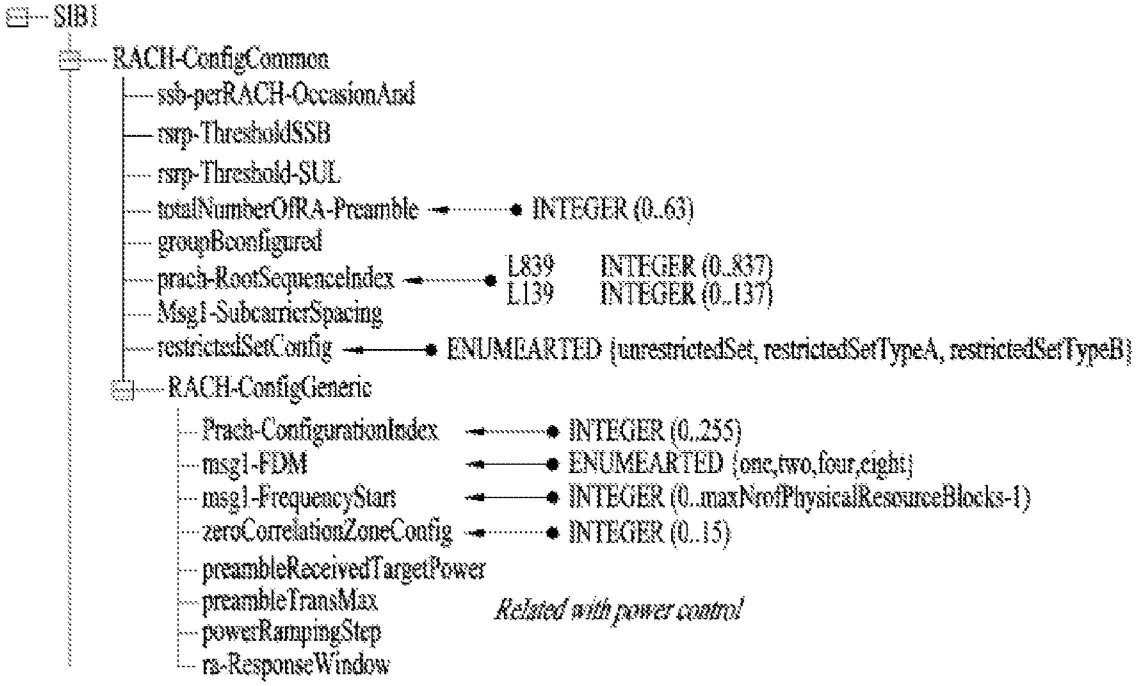
FIG. 12 illustrates an example of RACH configuration information.

FIG. 12 shows an example of RACH configuration information of a SIB1 or R-SIB1.

All of parameters of the RACH-ConfigCommon of FIG. 12 may be included in SIB1, or may be included in R-SIB1. Alternatively, some of the parameters of the RACH-ConfigCommon of FIG. 12 may be included in SIB1 or R-SIB1. Accordingly, the R-UE may receive only the SIB1 to perform RACH processing or may receive only the R-SIB1 to perform RACH processing, or may perform RACH processing by receiving both SIB1 and R-SIB1. Here, R-SIB1 may be replaced with SIBx as needed. That is, SIBx may transmit some or all RACH configuration information on behalf of R-SIB1.

A conventional UE receives system information in an idle mode or activates an initial downlink BWP to receive a paging message. However, the R-UE may not support the existing initial downlink BWP or may be inappropriate for the existing initial downlink BWP, so that the R-UE may receive either system information or a paging message by activating the initial downlink R-BWP dedicated to the R-UE or may receive a paging message. Therefore, if the UE performs RACH processing for initial access, downlink transmission information received by this UE operation may occur in the initial downlink BWP, or may occur in the initial downlink R-BWP.

On the other hand, 1) the R-UE may perform RACH processing through the initial uplink BWP or the initial uplink R-BWP based on the same RACH configuration information as in the conventional UE, 2) the R-UE may perform RACH processing through the initial uplink BWP or the initial uplink R-BWP based on the R-UE dedicated RACH configuration information, or 3) the R-UE may perform RACH processing through the initial uplink BWP or the initial uplink R-BWP according to the configuration information corresponding to a combination of the RACH configuration information of the conventional UE and the RACH configuration information dedicated for the R-UE.

In the same manner as in the conventional UE, in the R-UE, 1) when the UE requests or resumes RRC connection, 2) when the UE is handed over to a neighboring cell or performs SCG (secondary cell group) addition, 3) when the UE transmits a scheduling request to the BS, 4) when the UE instructs UE random access through a PDCCH order, 4) when the UE requests system information, 6) when beam failure or RRC connection failure is detected, or 7) when transmission of a system information message as well as SIB1 is requested, uplink transmission may occur.

If the BS configures a plurality of initial uplink BWPs for the serving cell of the UE, the BS may determine whether to perform RACH processing using a first initial UL/DL BWP through SIB1 in a certain case, or may determine whether to perform RACH processing using a second initial UL/DL BWP through SIB1 in a certain case. In this case, the UE may determine which initial uplink/downlink BWP will be used for RACH processing according to which case will be used for RACH triggering. For example, the first initial UL/DL BWP is a BWP used by general UEs, and the second initial UL/DL BWP is an R-BWP used by R-UEs. Alternatively, when the BS transmits a paging message to a specific UE, DCI configured to instruct such paging transmission or an RRC paging message used for transmission of such paging message can transmit the initial DL/UL BWP ID. In addition, if the UE ID is included in the paging message, the UE may perform RACH processing using the initial UL/DL BWP mapped to the corresponding BWP ID.

On the other hand, the BS may configure the initial UL/DL BWP according to the UE capability or the UE type. The first initial UL/DL BWP may be a BWP that is used by UEs each having 1 Rx capability, and the second initial UL/DL BWP may be a BWP that is used by UEs each having 2 RX capability. Alternatively, the first initial UL/DL BWP may be a BWP used by UEs having full duplex capability, and the second initial UL/DL BWP may be a BWP used by UEs having half duplex capability.

If the UE in the idle mode or the UE in the connection mode performs processing of the RACH composed of four or two stages according to the above-described case, the R-UE performs the following steps.

1) R-UE may select the initial UL/DL BWPs for the RACH according to the capability or the UE type. The UE may receive SIB1, R-SIB1 or SIBx (where x>1), so that the UE can recognize cases required for BWP selection based on the received SIB1 or R-SIB1. In addition, the UE may recognize the frequency position and size of the selected BWP. For example, the first or last PRB position of the R-BWP may be set to the PRB position compared with the first or last PRB position of the general initial BWP used by Rel-15/16 UEs. In this case, the PRB of the R-BWP or the PRB of the general BWP may overlap each other, and some PRBs in the general initial BWP may be set to R-BWP.

On the other hand, the UE may receive a special random access configuration, and may perform RACH processing with the selected uplink/downlink BWP using the received random access configuration. If one or more essential RACH parameters required for performing RACH processing are not included in the special random access configuration of the serving cell, the UE may perform RACH processing using either the corresponding RACH parameter value of a general random access configuration or the remaining RACH parameter values of the special random access configuration.

Figure 13:
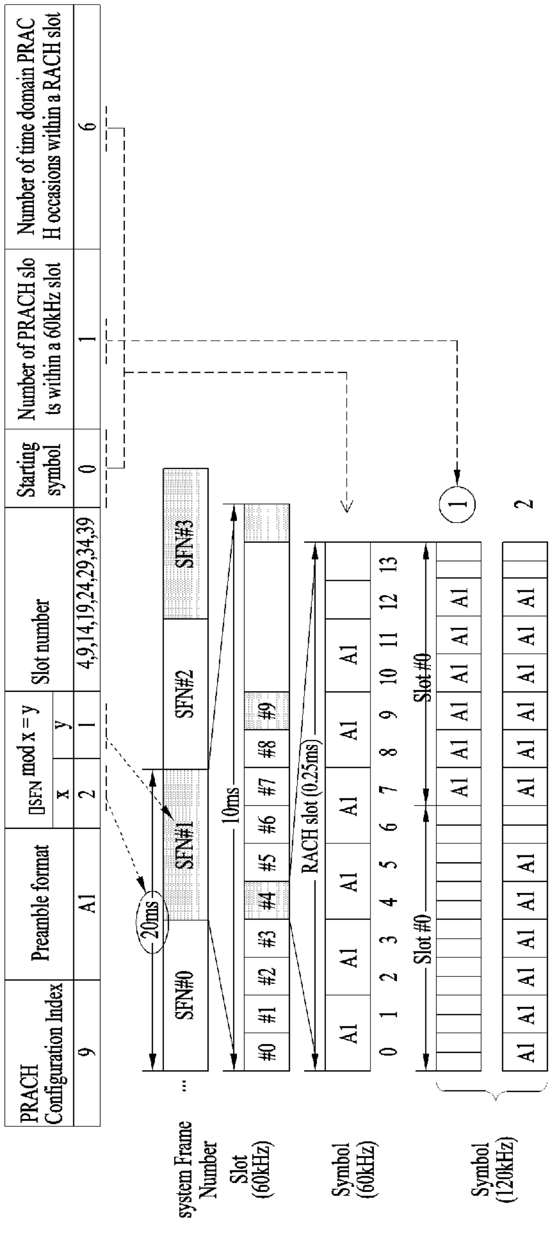
FIG. 13 illustrates an example of specific random access configuration in an embodiment of the present disclosure.

FIG. 13 illustrates an example of a specific random access configuration when a special random access configuration and a general random access configuration share PRACH resources according to an embodiment of the present disclosure.

The special random access configuration and the general random access configuration may share PRACH resources of the same uplink BWP, and may be divided into RACH resources of different uplink BWPs. If PRACH resources of the same uplink BWP are divided into a special random access configuration and a general random access configuration, the BS may configure a special random access configuration as the following one configuration or a plurality of configurations.

Separate SFN numbers: The general random access configuration and the special random access configuration are allocated different SFN values, so that the R-UE and the general UE may transmit Msg1 or MsgA using different PRACH resources.

For example, the general random access configuration is set to "SFN number mode 2=0", and the special random access configuration is set to "SFN number mode 2=1". In this case, the RACH operation may be performed using PRACH resources included in "SFN number mode 2=1" for the R-UE.

Number of PRACH slot within 60 kHz

The general random access configuration and the special random access configuration may be set to different RACH slots. For example, the special random access configuration may be set to Slot #1, and the general random access configuration may be set to Slot #0, or vice versa.

Separate slot number(s)

The general random access configuration and the special random access configuration may be set to different RACH slots. For example, the special random access configuration may be set to "slot number=4,9,14,19,24,29,34,39", and the general random access configuration may be set to "slot number=5,11,15,22,25,33,35", so that the special random access configuration and the general random access configuration may not overlap each other.

By a combination of "Separate starting symbol in a RACH slot+No of PRACH occasions within a RACH slot", different RACH resources are configured by a general random access configuration and a special random access configuration.

For example, different starting symbols may be set in a RACH slot in which the general random access configuration and the special random access configuration are equal to each other, and "No of PRACH occasion" value may be set so as not to exceed RACH resources of the general random access configuration and the special random access configuration.

2) The R-UE may measure an SSB beam or a CSI-RS beam through the initial downlink BWP or the initial downlink R-BWP. The UE may select a RACH preamble and a PRACH resource linked/mapped to the index (i.e., beam) of the best SSB or the index of the CSI-RS. At this time, the RACH configuration information of SIB1 or R-SIB1 may indicate information about which DL BWP will be used either for DL BWP-based beam measurement by the UE or for RACH processing by the UE. Alternatively, the UE may measure the SSB or CSI-RS beam on the basis of the active DL BWP, and may select the RACH preamble and the PRACH resource, each of which corresponds to the best beam. For example, if the initial downlink R-BWP is active, the SSB or CSI-RS beam of the initial downlink R-BWP is measured. In contrast, if the initial downlink R-BWP is not active and the existing initial downlink BWP is active, the SSB or CSI-RS beam of the existing initial downlink BWP is measured to select a RACH preamble and a PRACH resource corresponding to the best beam.

If the same PRACH resources of the RACH slot in which a general random access configuration and a special random access configuration are equal to each other are configured, the UE may allocate the corresponding PRACH resources only to the general random access configuration. In the special random access configuration, the corresponding PRACH resources are determined to be an invalid PRACH resource or an invalid RACH slot. That is, although the same RACH slot is used, the general random access configuration and the special random access configuration are allocated different RACH resources (e.g., different PRACH preambles), the valid PRACH resource or the valid RACH slot in the special random access configuration may be determined. In this case, when the R-UE performs RACH processing using the special random access configuration, and when the general random access configuration and the special random access configuration indicate the same RACH resources (e.g., the same PRACH preamble of the same RO of the same RACH slot), it is determined that the same RACH resources are invalid, PRACH transmission is performed by selecting other RACH resources, and PRACH transmission is then performed through the next PRACH occasion. If the general random access configuration and the special random access configuration indicate other RACH resources (e.g., different PRACH preambles of the same or different ROs in a situation where the same RACH slot is used) in which the general random access configuration and the special random access configuration are different from each other, PRACH transmission may be performed using the corresponding RACH resources.

On the other hand, if the BS provides the PRACH resource set and the RACH preamble set that are allocated to be dedicated for the UE through SIB1 or R-SIB1, the R-UE must select the RACH preamble and the PRACH resource corresponding to the best beam from among the PRACH resource set and the RACH preamble set that are allocated to be dedicated for the R-UE. Accordingly, the BS receiving the above message can recognize that the corresponding UE is the R-UE, thereby properly performing transmission and reception of the message. Otherwise, the RACH preamble and the PRACH resource corresponding to the best beam from among the RACH preamble set and the PRACH resource set that are shared by the R-UE and the conventional UE can be selected.

3) The UE may transmit the RACH preamble (i.e., Msg1) or the RACH MsgA using the RACH preamble and the PRACH resource that have been previously selected through the selected activated uplink BWP. If the UE does not receive the response of Msg1 or MsgA, the UE may select the RACH preamble and the PRACH resource in the same manner as in the above-described scheme, and may transmit the RACH preamble (i.e., Msg1) or the RACH MsgA through the activated BWP. At this time, the BWP may be re-selected in the same manner as described above. When the re-selected BWP is different from the first selected BWP, the first selected uplink BWP and the downlink BWP mapped to the first selected uplink BWP may be deactivated.

4) After transmitting the RACH preamble (i.e., Msg1) or the RACH MsgA, the UE may attempt to receive a response (e.g., RAR or MsgB) through the activated initial downlink BWP or the initial downlink R-RWP. For example, if the Type1-PDCCH CSS set is configured through PDCCH-ConfigCommon, the UE may monitor a PDCCH together with a CRC scrambled with the RA-RNTI or the temporary C-RNTI through the corresponding CSS (Common Search Space).

At this time, the CSS for the RACH response may be located at the initial downlink BWP or the initial downlink R-BWP according to the configuration information provided by the BS. For example, the R-UE may transmit the RACH preamble or the RACH MsgA via the initial uplink R-BWP, and may monitor DCI scrambled with the RA-RNTI through a CSS of the initial downlink BWP. Alternatively, the R-UE may transmit the RACH preamble or the RACH MsgA via the initial uplink R-BWP, and may monitor DCI scrambled with the RA-RNTI through the CSS of the initial downlink R-BWP. In this case, the DCI may indicate a downlink BWP through which the R-UE should receive the PDSCH. For example, the received DCI may indicate the initial downlink BWP or may indicate the initial downlink R-BWP. Alternatively, SIB1 or R-SIB1 may indicate a downlink BWP through which the R-UE should receive a PDSCH. The R-UE may select and activate the indicated downlink BWP, and may receive the PDSCH through the selected downlink BWP.

5) When the DCI received through the PDCCH is a C-RNTI and this C-RNTI is equal to the C-RNTI of the R-UE, or when a random access response (RAR) MAC control element included in the PDSCH indicates a RACH preamble selected by the UE, the UE may determine that the Msg2 or the MsgB was successfully received. In this case, when the contention based RACH is used, this RACH information can instruct the UE to perform switching to a specific UL/DL BWP simultaneously with allocation of the UL grant so that DCI CRC-scrambled with RA-RNTI, RAR MAC control element, or MAC CE for MsgB can be used for Msg3 transmission. For example, the above RACH can instruct the UE to perform switching to the initial UL/DL BWP or the initial UL/DL R-BWP. According to the corresponding instruction, the UE may activate the UL/DL BWP, and may deactivate the previous UL/DL BWP. Subsequently, the UE may transmit a PUSCH for Msg3 or the like through the activated UL BWP, or may monitor Msg4 transmission through the activated DL BWP. In the 2-step RACH, the UE may transmit a PUCCH HARQ ACK for MsgB through the activated BWP.

Alternatively, when the contention-free RACH is used, DCI CRC-scrambled with C-RNTI may instruct the UE to perform switching to a specific UL BWP, and may allocate the UL grant. In this case, after switching to a specific UL BWP, the UE may perform PUSCH transmission using the UL grant.

Figure 14:
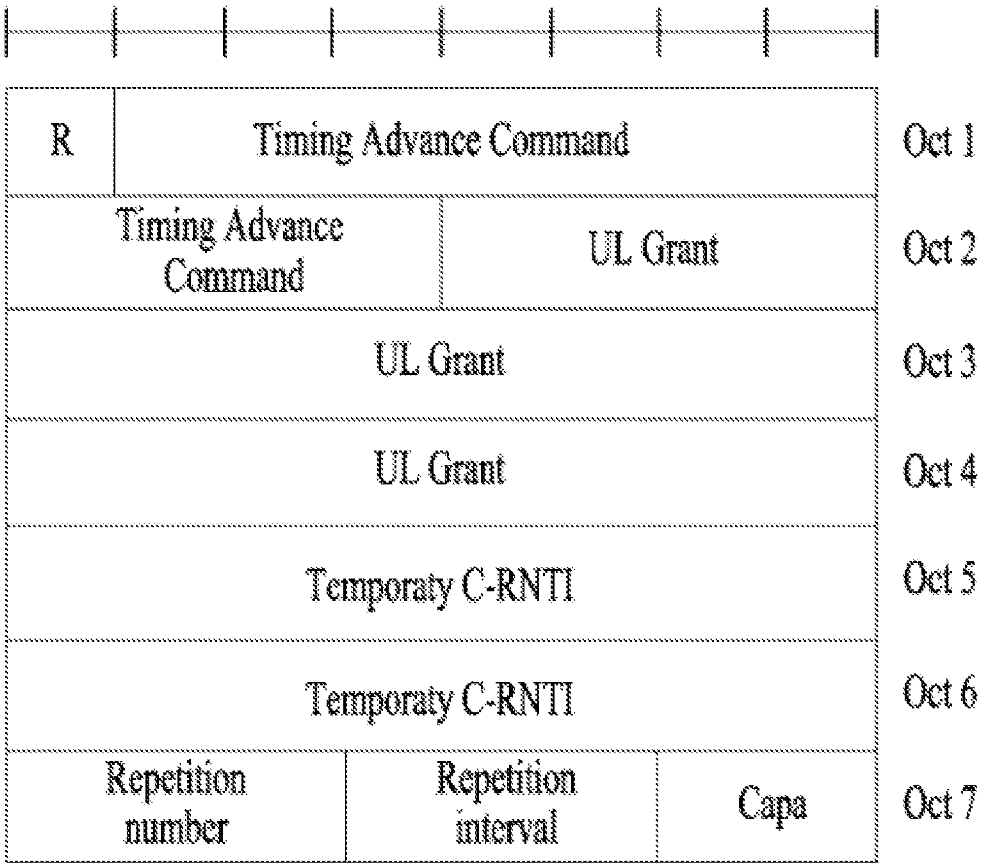
FIG. 14 illustrates an MAC control element included in MAC random access response.

5) When the contention-based RACH is used, Msg2 DCI being CRC-scrambled with an RA-RATI, an RAR (Random Access Response) MAC Control Element, or a MAC CE for MsgB can request the UE capability or the UE type. For example, the PRACH Preamble ID transmitted by the UE is included in the sub-header of the Msg2 MAC PDU, and one or more fields (e.g., "Capa" field of FIG. 14) of the RAR MAC CE for the corresponding sub-header may request the UE capability or the UE type. For example, if the Capa field of FIG. 14 is set to 10, this means that the capability of 1Rx UE is requested. If the Capa field of FIG. 14 is set to 01, this means that the capability of 20 MHz UE is requested. If the Capa field of FIG. 14 is set to 11, this means that the capability of 20 MHz UE is requested. If the Capa field of FIG. 14 is set to 00, this means that the capability of a UE supporting PUCCH/PUSCH/PDCCH/PDSCH repetitive transmission is requested.

Alternatively, the above-described field may indicate whether the BS supports the capability of the specific UE or the UE type. For example, if the Capa field shown in FIG. 14 is set to 10, this means that the 1Rx UE is supported, and if the Capa field shown in FIG. 14 is set to 01, this means that the 20 MHz UE is supported. If the Capa field shown in FIG. 14 is set to 11, this means that the 1Rx UE and the 20 MHz UE are supported, and if the Capa field shown in FIG. 14 is set to 00, this means that a UE supporting PUCCH/PUSCH/PDCCH/PDSCH repetitive transmission is supported.

If the Msg2 DCI or the RAR MAC CE (or MsgB) requests the UE capability or the UE type, the UE may enable the UE capability or the UE type to be included in a PUSCH MAC PDU or a UCI. For example, if the PUCCH is allocated through the Msg2 or UCI piggybacking is indicated, the UE indicates the UE capability or the UE type using a specific UCI bit of the Msg3. For example, when 2-bit UCI bits are allocated as 'RAR MAC CE' or 'SIB1', '10' may indicate 1RX UE, '01' may indicate 20 MHz UE, '11' may indicate 1RX and 20 MHz UE, and '00' may indicate a UE capable of supporting PUCCH/PUSCH/PDCCH/PDSCH.

Alternatively, the MAC subheader of the Msg3 PUSCH MAC PDU (or MsgA PUSCH payload) may include an LCID field, and may indicate the UE capability or the UE type through any one of the reserved codepoints/indexes of the LCID field. For example, when the RACH for initial connection is used, "LCID codepoint/index=35" may indicate a CCCH message of the 1RX UE, "LCID codepoint/index=36" may indicate a CCCH message of the 20 MHz bandwidth UE, "LCID codepoint/index=37" may indicate a CCCH message of the 20 MHz bandwidth and the 1RX UE, and "LCID codepoint/index=38" may indicate a CCCH message of a UE supporting PUCCH/PUSCH/PDCCH/PDSCH repetitive transmission.

Alternatively, the UE capability or the UE type may be indicated through the Msg3 PUSCH DMRS (or MsgA PUSCH DMRS). For example, different DMRS sequences may indicate the 20 MHz bandwidth and the 1RX UE, respectively.

A specific field of the RAR may indicate whether the BS supports the capability of a specific UE or the type of the specific UE may be indicated. For example, if the Capa field of FIGS. 2 to 4D is set to 10, this means supporting of the 1RX UE. If the Capa field is set to 01, this means supporting of the 20 MHz UE. If the Capa field is set to 11, this means supporting of the 1RX UE and the 20 MHz UE. If the Capa field is set to 10 or 11 and the UE performing the RACH operation is the 1RX UE, the UE may continuously perform the RACH process by sending the Msg3. However, if the Capa field is set to 01 and the UE performing the RACH procedure does not transmit the Msg3, the RACH preamble is retransmitted after completion of a backoff, or the RACH process is stopped. For example, in this case, the UE is backoff according to the value indicated in the BI field, and then retransmits the RACH preamble. Alternatively, the corresponding RACH process is stopped, connection to the current serving cell is inhibited, and cell reselection is performed by finding another cell.

Thereafter, the BS may allocate Msg3 resources, may transmit the Msg4, or may allocate the Msg5 resources, according to the UE capability or the UE type.

On the other hand, the UE performing the RACH in the R-BWP may perform a RACH backoff according to the BI received from the downlink R-BWP. On the other hand, the UE performing the RACH in the BWP may retransmit the PRACH preamble after performing backoff according to the BI received from the general downlink initial BWP. For example, if the Msg2 is not received after Msg1 transmission, the R-UE may perform the RACH backoff according to the BI received from the downlink R-BWP for the RACH in the R-BWP. Alternatively, a R-UE dedicated scaling factor being received by SIB1 may be applied to the BI value received from the RAR, the resultant value is then backed off and the PRACH preamble is retransmitted. At this time, different scaling factors can be applied according to the UE capabilities or the UE types. For example, if the BI value received by the RAR is 100 ms, and the scaling factor of the 1RX UE or the scaling factor of the UE supporting repetitive transmission is set to 2, the UE not receiving the Msg2 is backed off by 200 ms (100×2) and then retransmits the PRACH preamble. Alternatively, the RAR MAC CE may include different BI values according to the UE capability or the UE type, and the backoff may be processed according to the UE capability and the BI value of the RAR MAC CE, and the PRACH preamble is then retransmitted.

On the other hand, the BS may set the scaling factor through the RAR MAC CE or SIB1 for the UE configured to repeatedly transmit the Msg3 PUSCH N times. For example, if the scaling factor for the UE configured to perform N-times repetitive transmission is set to 0.5, the UE may apply 50 ms backoff when the received BI value is 100 ms. For example, the UE supporting PUSCH repetitive transmission may repeatedly transmit a Msg3 PUSCH N times according to an instruction of the BS. At this time, when the ra-ContentionResolutionTimer may be (re)started after transmission of the Msg3 PUSCH, and the Msg4 is not received until the ra-ContentionResolutionTimer expires, 50 ms backoff may be performed according to the scaling factor. However, when the Msg2 is not received, the scaling factor is not applied, and backoff is performed according to 100 ms corresponding to the received BI value.

Alternatively, if the UE retransmits the PUSCH N times, a backoff value proportional to or inversely proportional to the N value is required. For example, the UE configured to perform repetitive transmission may calculate the backoff value to be "(BI value/N value)", so that the backoff process is performed after failure of Msg2, Msg4, or MsgB reception.

6) When contention-based 4-step RACH is used, the UE may transmit Msg3 using the UL grant of a specific UL BWP allocated either by DCI being CRC-scrambled with RA-RNTI or by RAR MAC CE of Msg2 MAC PDU. In this case, DCI or RAR MAC CE can allocate repeated Tx resources of Msg3 PUSCH. For example, the PRACH preamble ID transmitted by the UE is included in the sub-header of the MSG2 MAC PDU, and one or more fields of the RAR MAC CE for the corresponding sub-header can allocate repetitive Tx resources of the MSG3 PUSCH. For example, the RAR MAC CE may include a repetition number field and a repetition interval field. Alternatively, the DCI may include a repetition number field and a repetition interval field.

If the UE supports repetitive transmission of the MSG3 PUSCH, the UE repeatedly transmits the PUSCH according to the UL grant, the repetition number field, and the repetition interval field. For example, the R-UE transmits an Msg3 TB using PUSCH resources caused by the UL grant in the same manner as in the conventional UE. Thereafter, if the repetition interval indicates N symbol/slot, the R-UE may repeatedly transmit the Msg3 TB using PUSCH resources caused by the UL grant for each N symbol/slot. In this case, the Msg3 TB may be repeatedly transmitted a predetermined number of times corresponding to the repetition number. If the UE does not support repetitive transmission of the Msg3 PUSCH, the UE may ignore the above field of the RAR MAC CE, and may transmit the Msg3 PUSCH once according to the UL grant.

Figure 15:
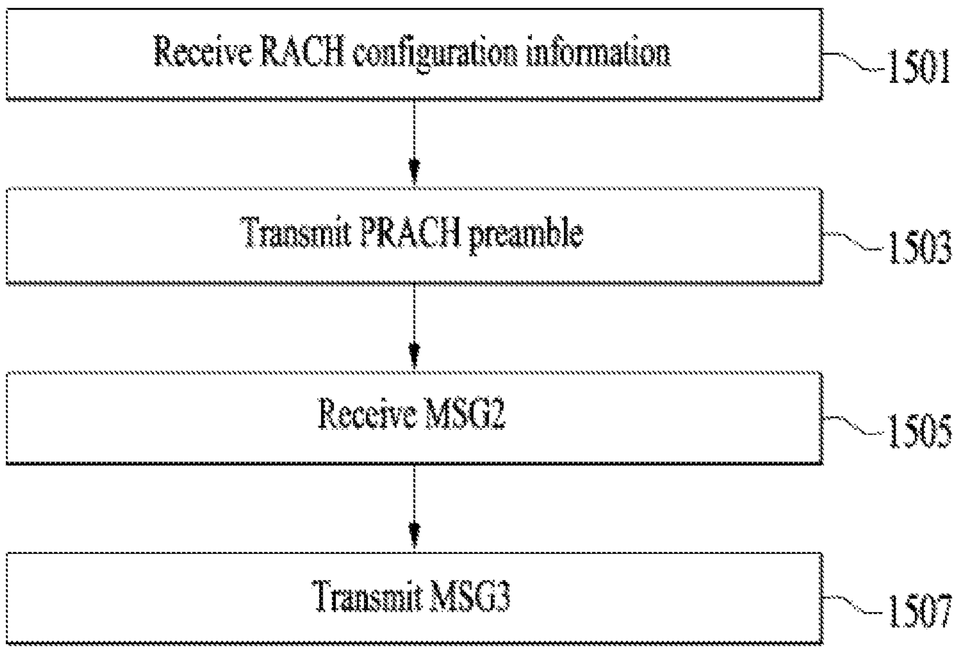
FIG. 15 illustrates a method of receiving a signal by a user equipment in an embodiment of the present disclosure.

FIG. 15 is a flowchart illustrating a method for receiving a signal by the UE according to an embodiment of the present disclosure.

Referring to FIG. 15, the UE may receive the random access configuration information (1501). The random access configuration information may include information on a first RACH resource configuration for a specific-type UE and information about a second RACH resource configuration for the legacy UE.

The UE may transmit a random access preamble through the PRACH on the basis of the random access configuration information (1503). The PRACH preamble may be transmitted through a valid RACH resource from among RACH resources according to the first RACH resource configuration. Among RACH resources according to the first RACH resource configuration, a resource overlapping with a RACH resource according to the second RACH resource configuration may be invalid.

The UE may receive a random access response (Msg2) for the PRACH (1505), and the UE may transmit the Msg3 on the basis of the random access response (1507).

Effects of the Present Disclosure

According to the present disclosure, when a UE having a specific limited capability is initially connected to a wireless network system through one cell, the RACH for initial access may be performed, and a method for indicating whether to support a specific function, such as limited capability or repetitive transmission/reception of the UE, may be proposed. As a result, the BS can perform the RACH process that is determined depending on the limited capability of a UE or a specific function supported by the UE.

Figure 16:
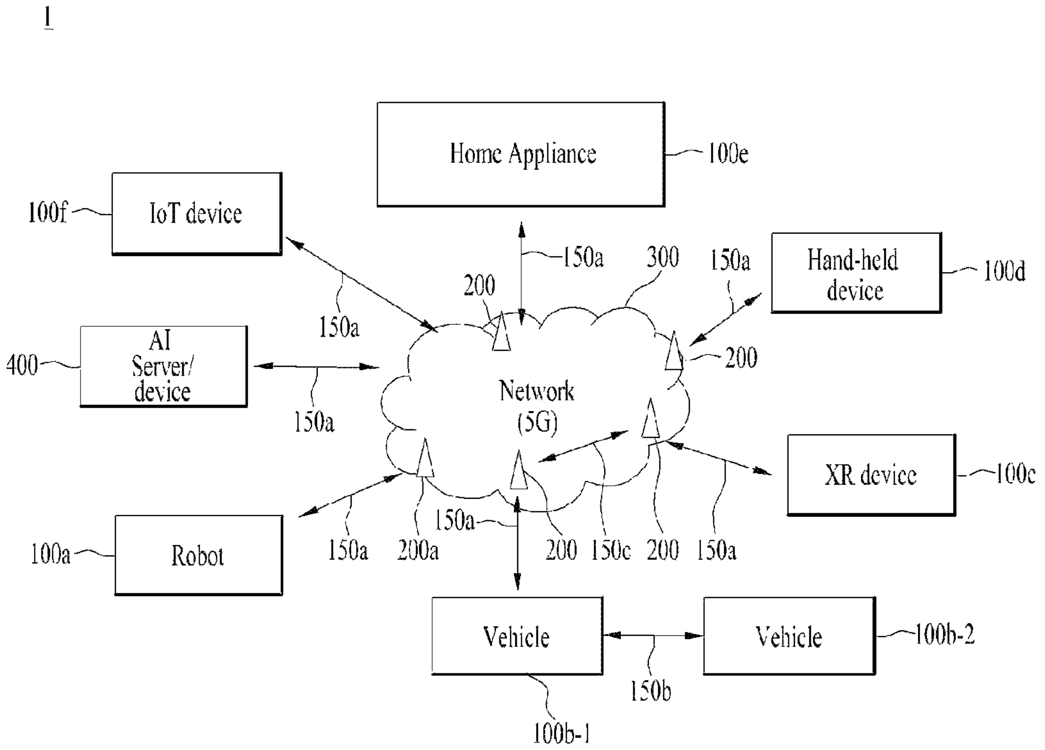
FIG. 16 to FIG. 19 illustrate a communication system 1 and wireless devices applied to the present disclosure.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD)

mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
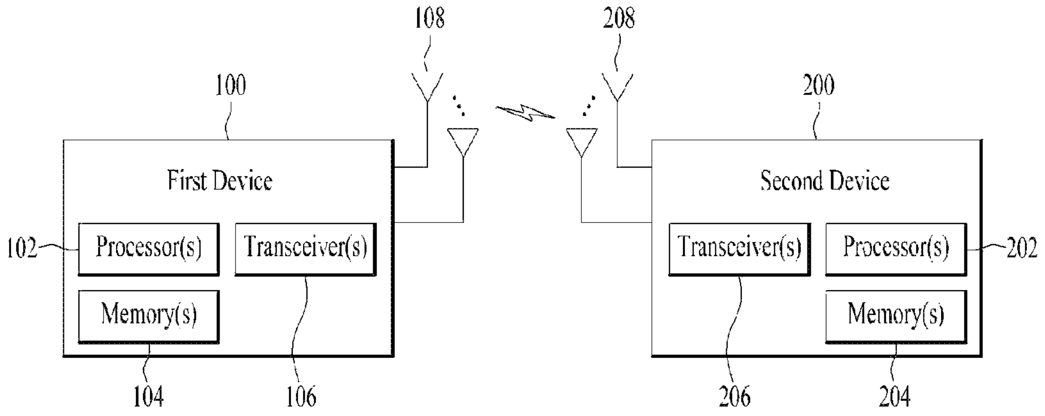

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
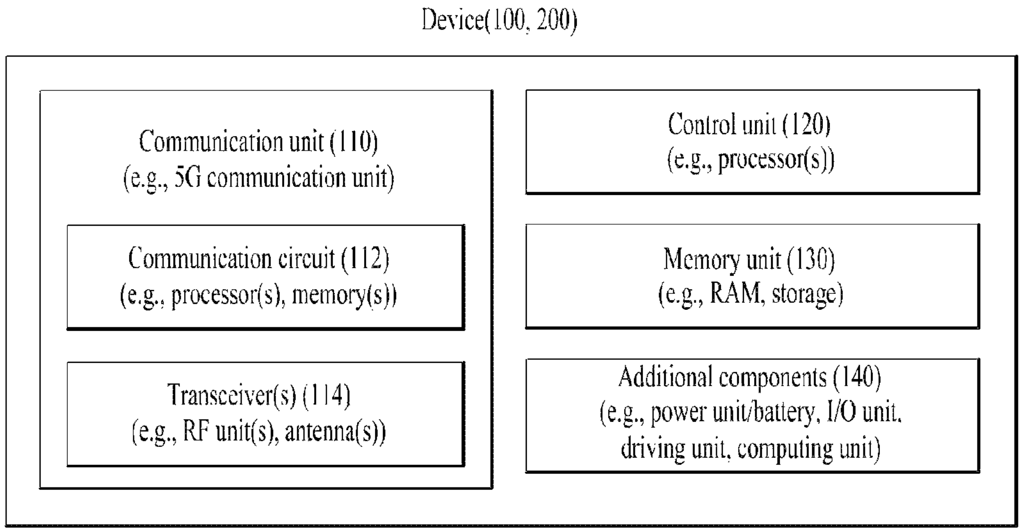

FIG. 18 illustrates another example of a wireless device applied to the present disclosure. The wireless device may be implemented in various forms according to a use-case/service (refer to FIG. 18).

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 19:
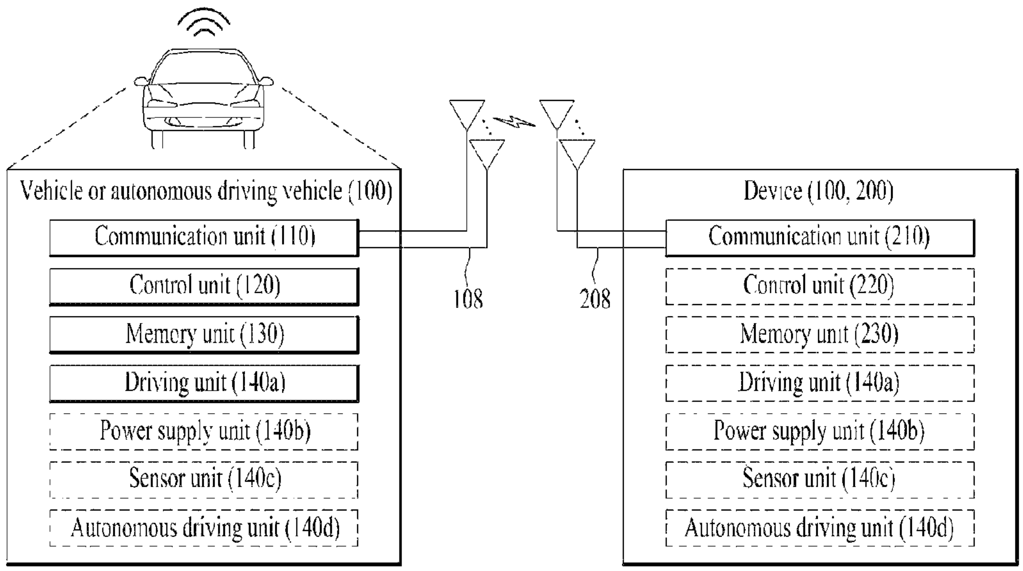

FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically configuration a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 20:
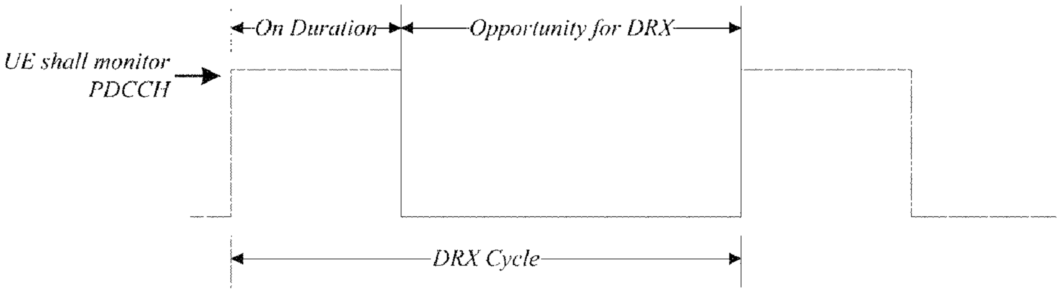
FIG. 20 illustrates an exemplary discontinuous reception (DRX) operation applied to the present disclosure.

FIG. 20 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 20, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 7

| | Type of signals | UE procedure |
|---|---|---|
| $1^{st}$ step | RRC signalling(MAC-CellGroupConfig) | Receive DRX configuration information |
| $2^{nd}$ Step | MAC CE((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method for receiving a signal in a random access procedure by a user equipment (UE) in a wireless communication system, the method comprising:

receiving random access configuration information;

transmitting a random access preamble through a physical random access channel (PRACH) based on the random access configuration information; and receiving a random access response to the PRACH, wherein the random access configuration information includes information about a first RACH resource configuration for a specific-type UE and information about a legacy UE;

from among RACH resources according to the first RACH resource configuration, a resource overlapping RACH resources caused by the second RACH resource configuration is invalid; and if the UE corresponds to the specific-type UE, the random access preamble is transmitted through a valid RACH resource from among the RACH resources caused by the first RACH resource configuration.

2. The method according to claim 1, wherein:

the first RACH resource configuration and the second RACH resource configuration have different system frame number (SFN) values, are allocated to different RACH slots, or are configured to have different starting symbols within the same RACH slot.

3. The method according to claim 1, further comprising:

when the first RACH resource configuration and the second RACH resource configuration indicate different PRACH preambles of different RACH occasions (ROs) in the same RACH slot, determining the resource for the first RACH resource configuration to be valid.

4. The method according to claim 1, further comprising:

when the first RACH resource configuration and the second RACH resource configuration are set to the same PRACH resources in the same RACH slot, determining the RACH resource for the second RACH resource configuration to be valid; and determining the RACH resource for the first RACH resource configuration to be invalid.

5. The method according to claim 1, further comprising:

when overlapping with the RACH resources caused by the second RACH resource configuration from among the RACH resources caused by the first RACH resource configuration is performed, determining the RACH resources caused by the second RACH resource configuration to be valid.

6. The method according to claim 1, wherein:

the random access response to the PRACH includes a separate backoff parameter for the specific-type UE.

7. The method according to claim 1, wherein:

the specific UE is a UE for supporting a reduced capability as compared to the legacy UE or is a UE for supporting an enhanced coverage as compared to the legacy UE, wherein the reduced capability refers to a limited transmission/reception bandwidth or a limited number of transmission/reception antennas.

8. A non-transitory computer readable medium having program code required for performing the method according to claim 1.

9. A user equipment (UE) for receiving a signal in a random access procedure of a wireless communication system, the UE comprising:

a transceiver; and at least one processor connected to the transceiver, wherein the at least one processor includes:

receiving random access configuration information;

transmitting a random access preamble through a physical random access channel (PRACH) based on the random access configuration information; and receiving a random access response to the PRACH, wherein the random access configuration information includes information about a first RACH resource configuration for a specific-type UE and information about a legacy UE;

from among RACH resources according to the first RACH resource configuration, a resource overlapping RACH resources caused by the second RACH resource configuration is invalid; and if the UE corresponds to the specific-type UE, the random access preamble is transmitted through a valid RACH resource from among the RACH resources caused by the first RACH resource configuration.

10. The user equipment (UE) according to claim 9, wherein:

the first RACH resource configuration and the second RACH resource configuration have different system frame number (SFN) values, are allocated to different RACH slots, or are configured to have different starting symbols within the same RACH slot.

11. The user equipment (UE) according to claim 9, wherein the at least one processor includes:

when the first RACH resource configuration and the second RACH resource configuration indicate different PRACH preambles of different RACH occasions (ROs) in the same RACH slot, determining the resource for the first RACH resource configuration to be valid.

12. The user equipment according to claim 9, wherein the at least one processor further includes:

when the first RACH resource configuration and the second RACH resource configuration are set to the same PRACH resources in the same RACH slot, determining the RACH resource for the second RACH resource configuration to be valid; and determining the RACH resource for the first RACH resource configuration to be invalid.

13. The user equipment (UE) according to claim 9, wherein the at least one processor further includes:

when overlapping with the RACH resources caused by the second RACH resource configuration from among the RACH resources caused by the first RACH resource configuration is performed, determining the RACH resources caused by the second RACH resource configuration to be valid.

14. The user equipment (UE) according to claim 9, wherein:

the random access response to the PRACH includes a separate backoff parameter for the specific-type UE.

15. The user equipment (UE) according to claim 9, wherein:

the specific UE is a UE for supporting a reduced capability as compared to the legacy UE or is a UE for supporting an enhanced coverage as compared to the legacy UE, wherein the reduced capability refers to a limited transmission/reception bandwidth or a limited number of transmission/reception antennas.

* * * * *